(12) United States Patent
Irwin, III

(10) Patent No.: US 6,425,765 B1
(45) Date of Patent: Jul. 30, 2002

(54) TRAINING DEVICE FOR ARCHERS

(76) Inventor: Albert J. Irwin, III, RR1, Box 96, Saltsburg, PA (US) 15681

( * ) Notice: Subject to any disclaimer, the term of this patent is extended or adjusted under 35 U.S.C. 154(b) by 0 days.

(21) Appl. No.: 09/291,716

(22) Filed: Apr. 14, 1999

(51) Int. Cl.⁷ .......................... A63B 69/00; G09B 9/00; G09B 19/00
(52) U.S. Cl. ..................... 434/247; 124/23.1; 124/86
(58) Field of Search ................ 124/1, 23.1, 86, 124/88, 89; 434/247, 392

(56) References Cited

U.S. PATENT DOCUMENTS

| | | | | |
|---|---|---|---|---|
| 1,564,089 A | * | 12/1925 | Maxwell ................... 124/23.1 |
| 2,526,369 A | * | 10/1950 | Kisselhorst ................ 124/23.1 |
| 2,763,156 A | * | 9/1956 | Garigal .................... 73/379.08 |
| 4,477,426 A | * | 10/1984 | Hartman .................... 211/85.7 |

* cited by examiner

Primary Examiner—Derris H. Banks
Assistant Examiner—Bena B. Miller
(74) Attorney, Agent, or Firm—Bartony & Hare

(57) ABSTRACT

An archery training device includes a support frame and a bow positioning mechanism attached to the support frame. The bow positioning mechanism includes an attachment member to attach an archery bow to the bow positioning member. The bow positioning member enables an archer to take aim with the archery bow to target the bow (and thereby an arrow) in generally any direction while assisting the archer to stabilize the bow.

18 Claims, 5 Drawing Sheets though not necessarily identical to, a vertical plane when head 40 is leveled) and in a plane generally parallel to height adjustment member 30 (that is, though not necessarily identical to, a horizontal plane when head 40 is leveled).

TRAINING DEVICE FOR ARCHERS

FIELD OF THE INVENTION

The present invention relates to a training device, and, more particularly, to a training device for use by archers to improve their archery skills.

BACKGROUND OF THE INVENTION

Much error in archery results from instability of the archer in holding the bow, aiming the bow, pulling the string and releasing the string. Indeed, for the purpose of sighting bows, a number of devices have been developed that hold the bow, aim the bow, pull the string and control the release of the string to ensure repeatable results. See, for example, U.S. Pat. No. 5,628,300. While such devices may provide an archer with confidence that a target will be struck if the archer performs the above tasks correctly, they do not assist the archer in developing the skill, strength and stability to perform these tasks.

It is thus very desirable to develop a training device that assists the archer in improving the skills associated with archery.

SUMMARY OF THE INVENTION

In general, the present invention provides an archery training device comprising: a support frame and a bow positioning mechanism attached to the support frame. The bow positioning mechanism includes an attachment member to attach an archery bow to the bow positioning member. The bow positioning member enables an archer to take aim with the archery bow to target an arrow in generally any direction while assisting the archer to support and/or stabilize the bow.

In one embodiment, the bow positioning mechanism comprises a first adjustment member allowing adjustment of the aim of the archery bow in a first plane and a second adjustment member allowing adjustment of the aim of the archery bow in a second plane generally orthogonal to the first plane. Preferably, the first plane is a generally horizontal plane, and the second plane is a generally vertical plane. Allowing simultaneous adjustment of the position of the archery bow in two generally orthogonal planes allows the archer to target the arrow in generally any direction.

The archery training device preferably further comprising an indicator to provide an indication if the archery training device is level with respect to a horizontal position.

The bow positioning mechanism of the archery training device may also comprise a locking mechanism to lock the archery bow in a desired position. For example, the first adjustment member may comprise a first locking mechanism to lock the position of the first adjustment member, and the second adjustment member may comprise a second locking mechanism to lock the position of the second adjustment member.

The archery training device of the present invention assists the archer in stabilizing virtually any bow while allowing the archer to control the aim of the bow, control the draw of the bowstring and control the release of the bowstring. The stability provided by the archery training device of the present invention enables the archer to improve his or her skill while reducing undesirable motion, tension and fatigue associated with archer practice.

DETAILED DESCRIPTION OF THE INVENTION

Figure 1:
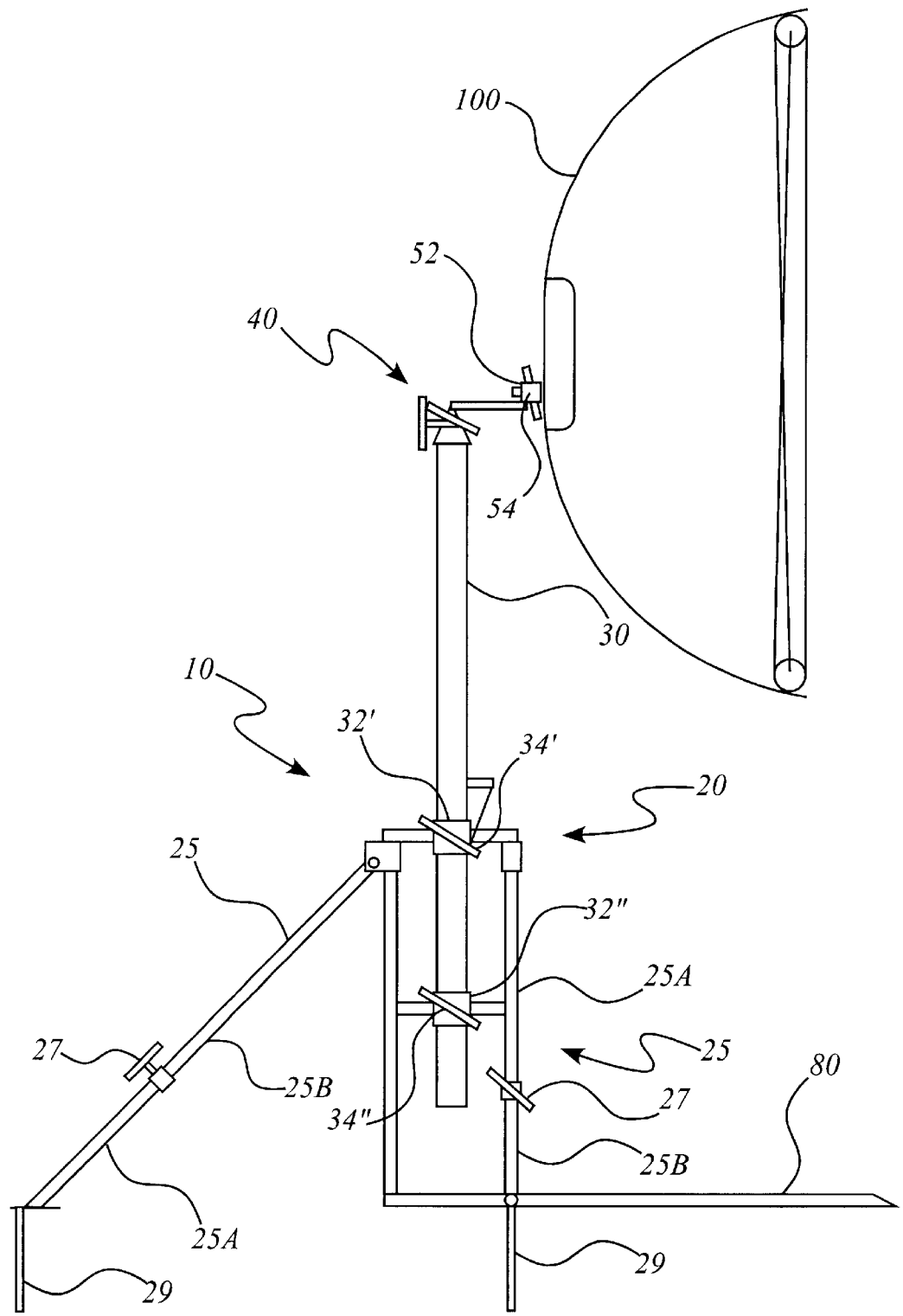
FIG. 1 illustrates a side view of an embodiment of an archery training device of the present invention.
Figure 2:
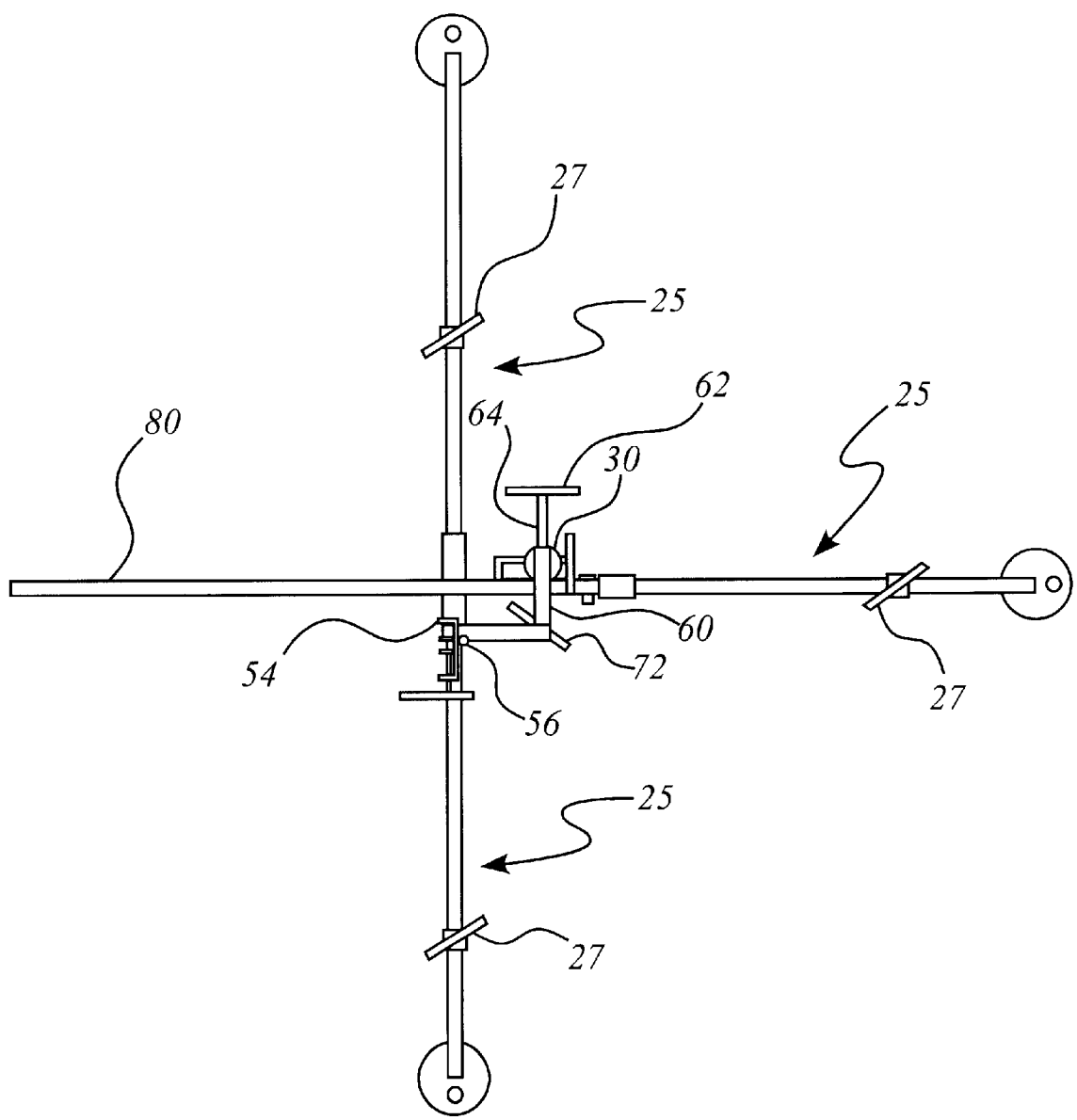
FIG. 2 illustrates a plan view of the embodiment of FIG. 1.
Figure 3:
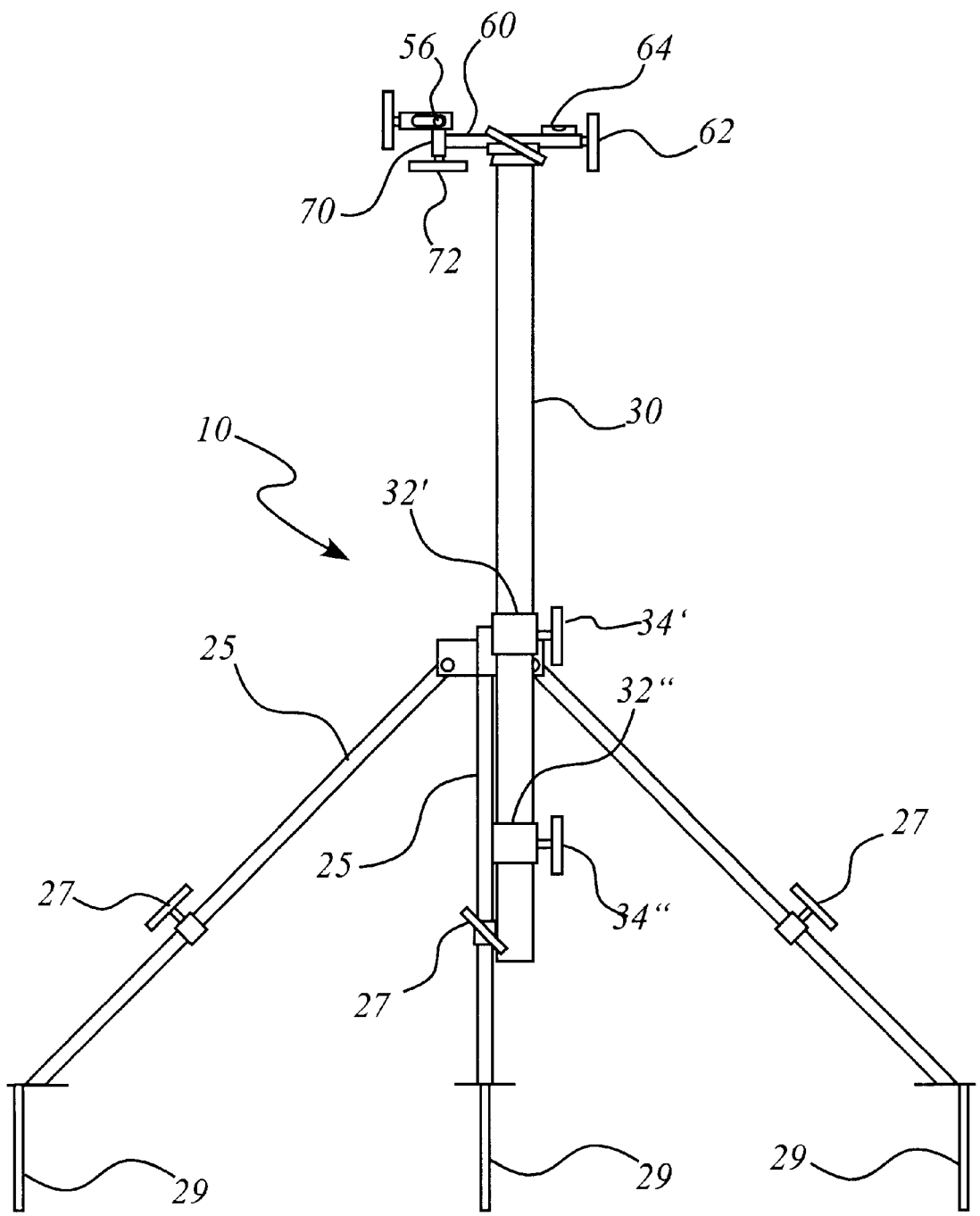
FIG. 3 illustrates a front view of the embodiment of FIG. 1.

The present invention provides an archery sighting and training device 10, for example, as illustrated in FIGS. 1 through 3. In general, device 10 assists an archer in stabilizing a bow 100 while sighting bow 100 or while practicing with bow 100.

Device 10 comprises generally a support frame 20. In the embodiment of FIGS. 1 through 3, support frame 20 preferably comprises at least three leg members 25. Leg members 25 preferably comprises telescoping members 25A and 25B to adjust the length of leg members 25 to, for example, accommodate uneven terrain. A T-bolt 27 can be used to lock telescoping leg member 25A and 25B in a desired position. Leg members 25 may comprise pegs 29 to be pounded into the ground to further stabilize support frame 20.

Leg members 25 preferably do not interfere with the stance of an archer using device 10. In that regard, as best illustrated in FIG. 2, leg members 25 preferably do not extend rearward into the area of the archer's stance (that is, the left side of FIG. 2). As seen in FIG. 2, legs 25 preferably extend outward over a 180° arc about the center of device 10. Device 10 also preferably further includes a stabilizing or alignment member 80 extending rearward therefrom. Stabilizing member 80 preferably extends rearward to assist in stabilizing device 10 against movement. Stabilizing member 80 also assist the archer in providing a reference to the position and/or the alignment of the archer with respect to device 10. With reference to member 80 (for example, to a foot rest thereon), the archer can take substantially the same stance relative to device 10 each time the archer uses device 10 which is very desirable during training.

Support frame 20 preferably further comprises a generally vertical, height adjustment member such as height adjustment bar 30 that slides through sleeves 32' and 32". When a desired vertical position is achieved, height adjustment bar 30 can be locked into position with, for example, T-bolts 34' ad 34".

At the top of height adjustment member 30 is a bow positioning mechanism or head 40. In general, bow positioning mechanism 40 comprises a bow attachment member 52 to which a standard bow 100 is attachable. Bow attachment member 52 can, for example, comprise a clamp 54 that attaches to bow 100. Bow attachment member 52 can also comprises a bolt 56 that attaches to a standard bow 100 via a threaded bow stabilizer mounting hole provided on standard bows. Bow attachment member 52 preferably prevents the archer from "twisting" the bow grip such that the bow is maintained in a generally upright or vertical plane.

Bow positioning mechanism 40 enables simultaneous adjustment of the orientation or aim of bow 100 in a plane orthogonal to height adjustment member 30 (that is, orthogonal to vertical) and in a plane parallel to height adjustment member 30 (that is, orthogonal to horizontal), thereby allowing unobstructed alignment of bow 100 in virtually any direction, particularly in the direction of the 180° arc defined by legs 25 (that is, in front of the archer). In the embodiment illustrated in FIGS. 1 through 3, such adjustment is enabled by a first pivot bar (not shown) or vertical adjustment bar that rotates within a sleeve 60 to adjust the alignment of bow 100 up and down (that is, vertically or orthogonal to horizontal). The position of the first pivot bar, and thereby the vertical orientation of bow 100, can be locked in place via a T-bolt 62. Sleeve 60, in which the vertical adjustment bar rotates, preferably has attached thereto a level 64 (for example, a bubble level) to enable level installation of device 10.

A second pivot bar or horizontal adjustment bar (not shown) rotates in a sleeve 70 in a plane generally orthogonal to that of the vertical adjustment bar and sleeve 60 to provide adjustment of the aim of bow 100 to the left and to the right (that is, horizontally or orthogonal to vertical). The position of the horizontal adjustment bar, and thereby the horizontal orientation of bow 100, can be locked in place via T-bolt 72.

In an alternative embodiment, bow positioning mechanism 40 can comprise a ball joint (not shown) rather than orthogonal positioning of pivot bars to adjust the aim/orientation of the bow.

Unlike prior sighting devices, device 10 allows the archer to aim the bow while drawing, holding and releasing the bow string. Device 10 enables the archer to draw the bowstring, hold the bowstring in a drawn position, aim the bow and release the bowstring naturally (that is, just as the archer would without the use of device 10), while substantially reducing movement of the bow typically associated with shooting an arrow. Device 10 supports the weight of the bow, stabilizes the grip hand, assists in properly positioning the grip hand (in an upright position), and provides some resistance against which the bowstring can be drawn rearward and maintained in a drawn position. Tension and movement are reduced at all times through drawing the bowstring, aiming the bow and releasing the arrow. Experimentation has shown that even novice archers can substantially improve their skills in a relatively short time with use of device 10.

FIGS. 4A through 5B illustrative an alternative embodiment of bow positioning mechanism 140 for use in the present invention. Bow positioning mechanism 140 is preferably attachable to height adjustment member 30 via a sleeve 160 in which a vertical adjustment bar 165 (see FIGS. 4B, 5A and 5B) rotates as described above in connection with bow positioning mechanism 40. Sleeve 160 preferably comprises a bubble level 164 to assist in level installation of bow positioning mechanism 140. The position of vertical positioning bar 165 within sleeve 160 can preferably be locked in position with T-bolt 162 shown attached to vertical position bar 165.

A connector portion 173 of bow attachment mechanism 152 is preferably attached to a flattened end 166 of vertical positioning bar 165 via a T-bolt or other type of bolt 172. Bow attachment mechanism preferably rotates around bolt 172 to allow horizontal positioning of the bow. Bow attachment mechanism 152 includes a bow cradle 174. Bow 100 is placed between side members 176 of bow cradle 174 and is preferably attached to bow cradle 174 via a bolt that passes through slot 178 in bow cradle 174 to be inserted within the bow stabilizer mounting hole. Bow cradle 174 preferably further comprises a clamp 180 that passes through one of side members 176 to assist in securely attaching bow 100 within bow cradle 174.

Figure 4A:
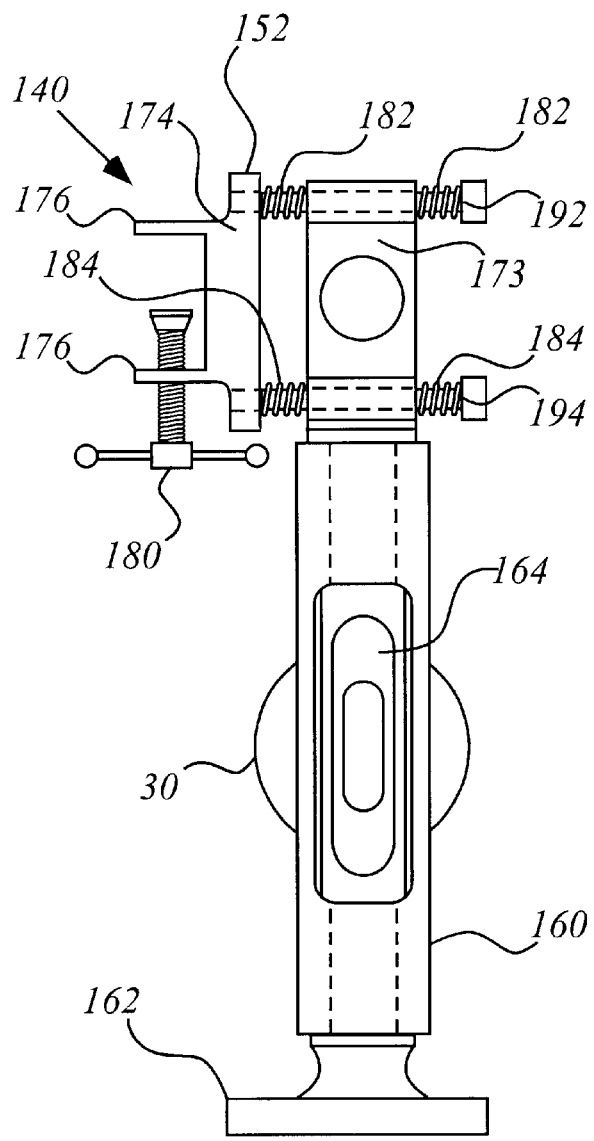
FIG. 4A illustrates a plan view of an alternative embodiment of a bow positioning mechanism.
Figure 4B:
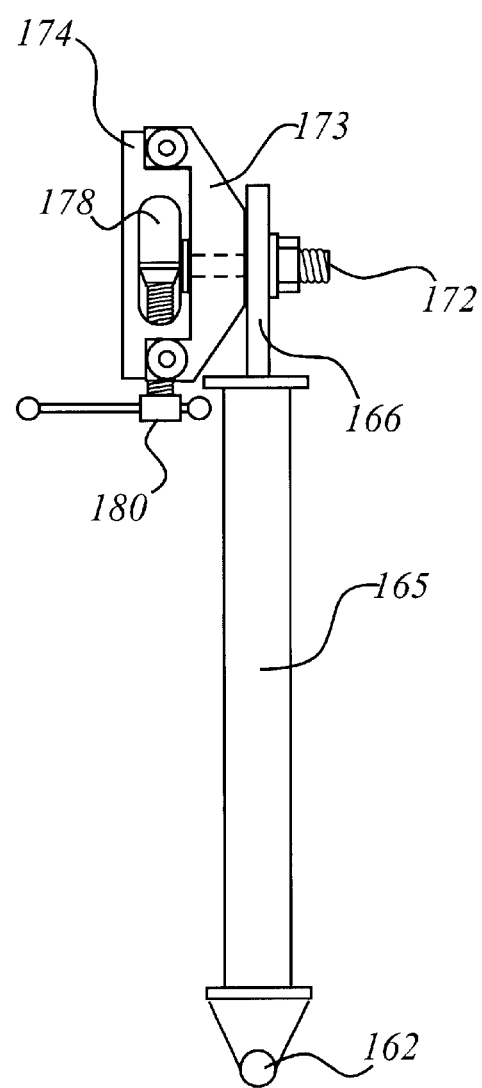
FIG. 4B illustrates a side view of the bow positioning mechanism of FIG. 4A.
Figure 5A:
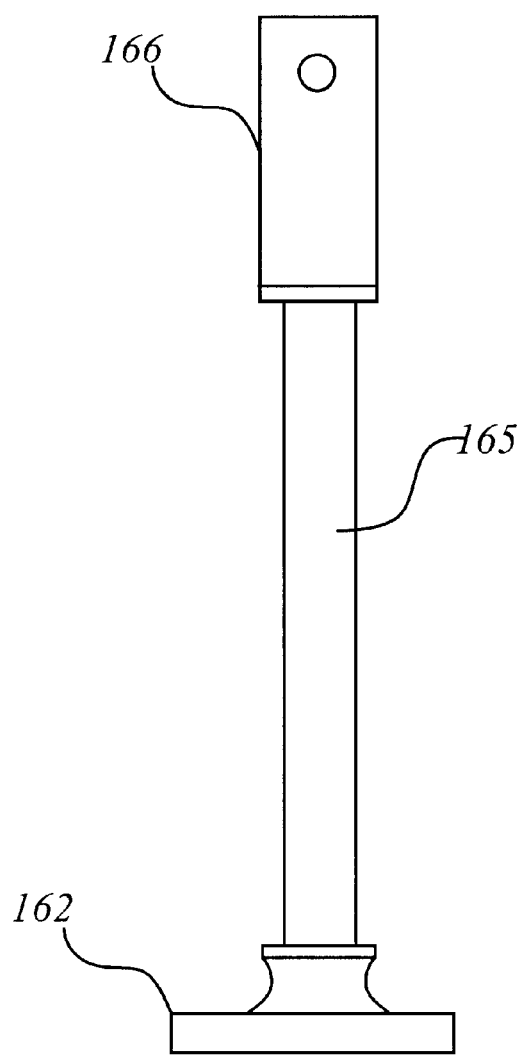
FIG. 5A illustrates a plan view of a vertical adjustment bar for use with the bow positioning mechanism of FIG. 4A.
Figure 5B:
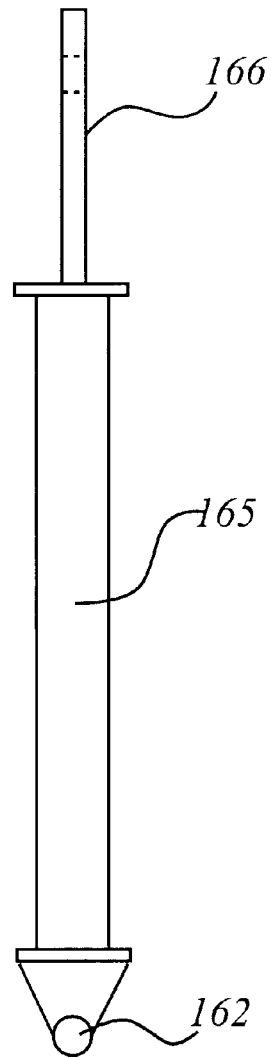
FIG. 5B illustrates a side view of the vertical adjustment bar of FIG. 5A.

In the embodiment of FIGS. 4A through 4B, bow attachment mechanism 152 comprises a mechanism to absorb the shock of the bow when the archer releases the bowstring. In that regard, cradle member 174 is preferably attached to connector portion 173 via two sets of springs 182 and 184 that ride over rods 192 and 194, respectively. Spring sets 182 and 184 act to dampen the shock of the bow when the bowstring is released by the archer.

Although the present invention has been described in detail in connection with the above examples, it is to be understood that such detail is solely for that purpose and that variations can be made by those skilled in the art without departing from the spirit of the invention except as it may be limited by the following claims.

What is claimed is:

1. An archery training device comprising:
   a. a support frame;
   b. a bow positioning mechanism attached to the support frame, the bow positioning mechanism including an attachment member to attach an archery bow to the bow positioning member, the bow positioning member enabling an archer to readily take aim with the archery bow to target the archery bow in generally any direction while assisting the archer to stabilize the bow; and
   c. an indicator to provide an indication of if the archery training device is level.

2. The archery training device of claim 1 wherein the bow positioning mechanism comprises a first adjustment member allowing adjustment of the aim of the archery bow in a first plane and a second adjustment member allowing adjustment of the aim of the archery bow in a second plane generally orthogonal to the first plane.

3. The archery training device of claim 2 wherein the first adjustment member comprises a first locking mechanism to lock the position of the first adjustment member and the second adjustment member comprises a second locking mechanism to lock the position of the second adjustment member.

4. The archery training device of claim 1 wherein the bow positioning mechanism further comprises a locking mechanism to lock the archery bow in a desired position.

5. The archery training device of claim 1 wherein the attachment member maintains the bow in a generally vertical plane.

6. The archery training device of claim 1 wherein the support frame does not interfere with the stance of the archer.

7. The archery training device of claim 1 wherein the support frame is adjustable for uneven terrain.

8. The archer training device of claim 1 wherein the archery bow is a standard archery bow and the archer bow is attached to the bow positioning member via a stabilizer mounting hole on the archery bow.

9. An archery training device comprising:
   a. a support frame;
   b. a bow positioning mechanism attached to the support frame, the bow positioning mechanism including an attachment member to attach an archery bow to the bow positioning member, the bow positioning member enabling an archer to readily take aim with the archery bow to target the archery bow in generally any direction while assisting the archer to stabilize the bow; and
   c. a reference member to assist the archer in positioning the stance of the archer relative to the training device.

10. An archery training device comprising:
a. a support frame;
b. a bow positioning mechanism attached to the support frame, the bow positioning mechanism including an attachment member to attach a standard archery bow to the bow positioning member via a stabilizer mounting hole on the archery bow, the bow positioning member enabling an archer to take aim with the archery bow to target the archery bow in generally any direction while assisting the archer to stabilize the bow.

11. The archery training device of claim 10 wherein the bow positioning mechanism comprises a first adjustment member allowing adjustment of the aim of the archery bow in a first plane and a second adjustment member allowing adjustment of the aim of the archery bow in a second plane generally orthogonal to the first plane.

12. The archery training device of claim 11 wherein the first adjustment member comprises a first locking mechanism to lock the position of the first adjustment member and the second adjustment member comprises a second locking mechanism to lock the position of the second adjustment member.

13. The archery training device of claim 10 further comprising an indicator to provide an indication of if the archery training device is level.

14. The archery training device of claim 10 wherein the bow positioning mechanism further comprises a locking mechanism to lock the archery bow in a desired position.

15. The archery training device of claim 10 wherein the attachment member maintains the bow in a generally vertical plane.

16. The archery training device of claim 10 further comprising a reference member to assist the archer in positioning the stance of the archer relative to the training device.

17. The archery training device of claim 10 wherein the support frame does not interfere with the stance of the archer.

18. The archery training device of claim 10 wherein the support frame is adjustable for uneven terrain.

* * * * *